United States Patent [19]

King

[11] Patent Number: 4,612,666

[45] Date of Patent: Sep. 16, 1986

[54] AUTOMATIC PATTERN RECOGNITION APPARATUS

[75] Inventor: William J. King, Burke, Va.

[73] Assignee: The United States of America as represented by the Secretary of the Navy, Washington, D.C.

[21] Appl. No.: 627,939

[22] Filed: Jul. 5, 1984

[51] Int. Cl.[4] ............................................. G06K 9/74
[52] U.S. Cl. ...................................... 382/32; 356/394
[58] Field of Search .................... 382/32, 31; 356/394

[56] References Cited

U.S. PATENT DOCUMENTS

| | | | |
|---|---|---|---|
| 3,435,244 | 3/1969 | Burckhardt et al. | 382/31 |
| 3,437,824 | 4/1969 | Lohmann | 382/31 |
| 3,483,513 | 12/1969 | Burckhardt et al. | 382/31 |
| 3,543,237 | 11/1970 | Cutler et al. | 382/31 |
| 3,622,488 | 11/1971 | Caulfield et al. | 382/31 |
| 3,634,695 | 1/1972 | Barringer | 382/31 |
| 3,636,512 | 1/1972 | Edwards | 382/31 |
| 3,666,359 | 5/1972 | Lee | 382/31 |
| 3,873,181 | 3/1975 | Chivian et al. | 382/31 |
| 4,282,510 | 8/1981 | Southgate | 382/31 |

Primary Examiner—Anthony V. Ciarlante
Attorney, Agent, or Firm—Kenneth E. Walden; John G. Wynn

[57] ABSTRACT

A pattern recognition apparatus makes use of both optical templation and signal correlation techniques by using liquid crystal panels, CCD type cameras, video storage techniques, inter alia, to detect and identify electronic signal patterns transmitted thereto. The apparatus is also configured to detect pattern changes and image object movement.

9 Claims, 5 Drawing Figures

AUTOMATIC PATTERN RECOGNITION APPARATUS

BACKGROUND OF THE INVENTION

1. Field of the Invention

The present invention relates to a display correlator system, but more particularly, it relates to a multipurpose automatic pattern recognition apparatus that makes use of both optical templation and signal correlation techniques.

2. Description of the Prior Art

Automatic pattern recognition is used to interpret signals from sensors to detect and identify unknown patterns. Automatic pattern recognition is used in machine reading typewritten material, product codes (optical character recognition), and signal, object, and target recognition and identification. Automatic pattern recognition is presently accomplished by two methods—optical templating and electronic signal correlation.

The most sophisticated optical templating method is to shine a light image of an unknown pattern through a hologram containing stored known pattern images. If a matching pattern is stored in the hologram, a point of light will be diffracted from the hologram. The position of the point of light can be used to identify which stored pattern in the hologram is a match with the unknown pattern. Deficiencies of this method are that the movement of unknown pattern or orientation or slight differences from the known pattern can substantially affect detection and identification. Large holograms and volume are required for better detection. More than one hologram is needed to make more than a few pattern recognitions.

A sophisticated electronic signal correlation method is to compare and match an electronic signal of an unknown pattern to electronic signals of algorithms of known patterns. Deficiencies of this method are the same as the foregoing method due to slight deficiencies in the algorithm generated pattern. A small amount of noise, obscuration, deletion, or additions can cause these automatic pattern recognition devices not to be able to make any detection or identification.

Large, sophisticated, complex and expensive software and computers are needed for the algorithm generation and comparison. When patterns from different sensors are correlated at one time, very large, complex, and expensive computers and software are required.

OBJECTS OF THE INVENTION

Accordingly, an important object of the present invention is to configure a multipurpose automatic pattern recognition apparatus using a combination of electronic, optics and electro-optics, and software to interpret electronic signals of patterns from associated apparatuses.

Another object of the present invention is to identify the patterns and the pattern change and to be able to signal associated apparatuses of the identification, the quality of the identification, and the change of patterns.

Still another object of the present invention is to be able to interface with associated apparatuses so as to send and receive control and advisory signals therefrom related to the patterns.

A further object of the present invention is to configure the apparatus to use the concept of templation in an improve manner such that the total optical image is templated concurrently in a precise manner.

SUMMARY OF THE INVENTION

In accordance with the above stated objects, other objects, features and advantages, the purpose of the invention is to configure a multipurpose automatic pattern recognition apparatus that is modular in design and that can be used to detect and identify electronic signal patterns transmitted thereto.

The essence of the present invention is in the use of improved optical templating in correlation with electronic signal correlation.

The purpose of the present invention is carried out by configuring the automatic pattern recognition apparatus to comprise a light source module, a first display module, a first optics module, a second display module, a second optics module and a camera module. The foregoing modules are configure to be packaged and aligned optically together.

The automatic pattern recognition apparatus further comprises a synchronization module, a processor module and a video memory module. The synchronization module is configured to coordinate the timing of the electrical and optical signals of the automatic pattern recognition apparatus except for the first and second optics modules. The processor module analyzes data from the camera module and makes decisions based on the analysis. The video memory module is configure to store the templates of the patterns in memory, and on command, rapidly recall the appropriate patterns with image corrections. The video memory module is also configured to transmit the pattern signals to the first and second display modules.

BRIEF DESCRIPTION OF THE DRAWINGS

The previously stated objects, other objects, features and advantages of the present invention will be apparent from the following more particular description of the preferred embodiment as illustrated in the accompanying drawings, in which.

DESCRIPTION OF THE PREFERRED EMBODIMENT

Figure 1:
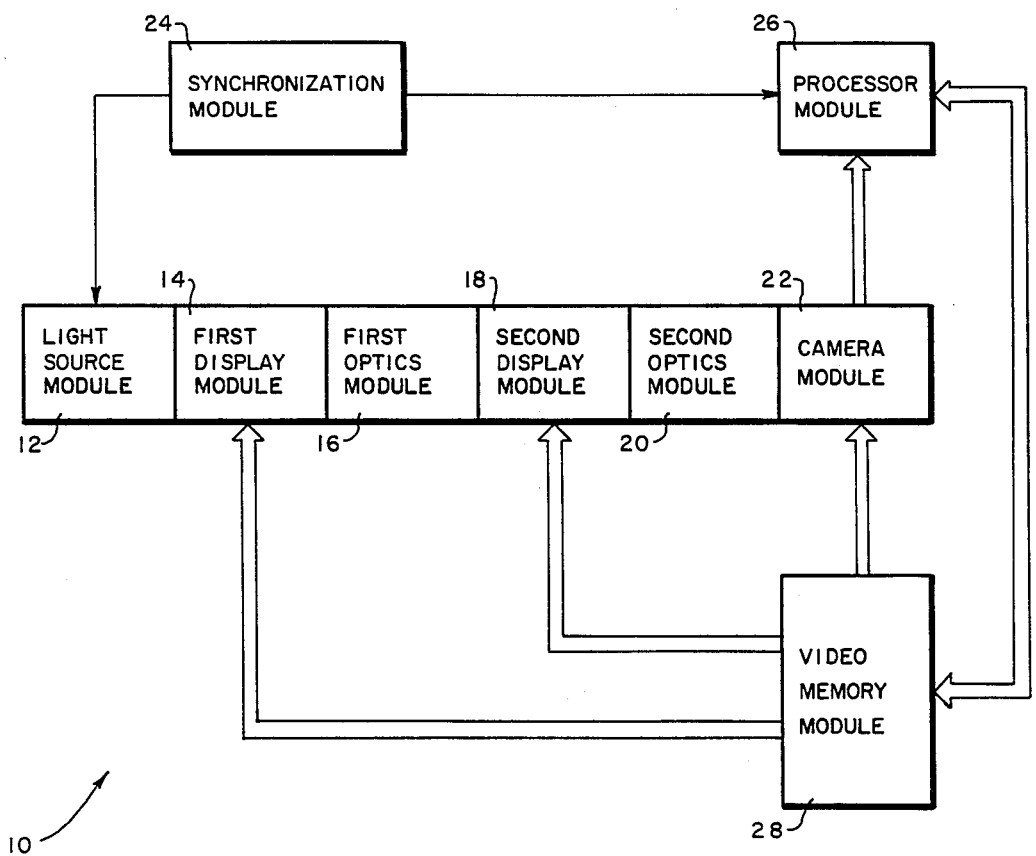
FIG. 1 is a block diagram representation of an automatic pattern recognition apparatus according to the present invention depicting, inter alia, a light source module, first and second display modules, first and second optics modules and a camera module.

FIG. 1 shows an embodiment of an automatic pattern recognition apparatus 10 in which the present invention is employed. Specifically, the automatic pattern recognition apparatus 10 comprises a light source module, a first display module, a first optics module, a second display module, a second optics module and a camera module. The foregoing elements are all packaged and aligned optically together. The appartus 10 further includes a synchronization module 24, a processor module 26 and a video memory module 28. The synchronization module 24 provides a central oscillator clock signal to coordinate timing of the electrical and optical signals in the apparatus 10. The processor module 26, for purposes of the present invention, is a high speed computer having a memory of substantial capacity. The processor module 26 is configured to analyze data from the camera module 22 and to make decisions based on the analysis. The processor module 26 also provides and receives advisory and control data from associated external apparatuses (not shown). Thus, the processor module 26 controls the movement of data in, out, and within the apparatus 10. Predetermined software programs allow the processor module 26 to perform the foregoing functions. To continue, the video memory module 28 is configured to store a video pattern template generated in memory. On command, the video memory module 26 rapidly recalls appropriate video patterns with image corrections and transmits the pattern signals to the first and second display modules 16 and 20, respectively. The video memory module 28 is also configured to transmit the corrected image to the associated external apparatuses.

Figure 2:
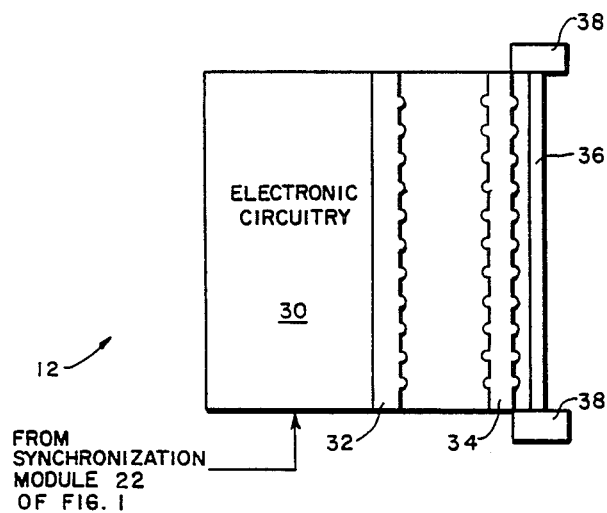
FIG. 2 is a pictorial representation of the light source module of FIG. 1.

Referring now to FIG. 2, the light source module 12, for purposes of the present invention, is less than 4 inches by 4 inches by 1 inch wide. It comprises electronic circuitry 30, light emitting devices 32, optics 34, a flat transparent surface 36, and alignment devices 38. The electronic circuitry 30 is configured to control the individual light emitting devices 32, and, accordingly, the timing and brightness levels thereof. The light emitting devices 32, which for purposes of the present invention, can be a flat matrix array of miniature light bulbs, light emitting diodes, or electroluminescent panels, are configured to provide light with a constant area brightness over a controlled period of time. The optics 34 is configured to provide an even brightness, constant color and constant polarization. For purposes of the present invention, the optics 34 comprises color and polarization filters and short fiber optics bundles or glass or plastic cylinders of which the ends are disposed perpendicular to the flat transparent surface 36 of the light source module 12. The alignment devices 38 can be configured of screws, holes, and/or pins so as to allow the flat transparent surface 36 to be align firmly against the first display module 14 of FIG. 3.

Figure 3:
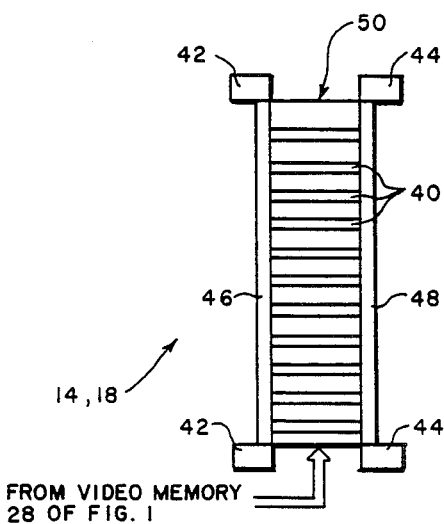
FIG. 3 is a pictorial representation of the first and second display modules of FIG. 1.

Referring then to FIG. 3, the first display module 14, for purposes of the present invention, is a transmissive flat panel display which contains m number by n number matrix array of picture elements 40. A high number of picture elements 40 is preferably, for example, 512 by 512 pixels or more. The position and alignment of the picture elements 40 is critical because the m by n picture elements 40 must align with the m by n optical elements of the first and second optics modules 16 and 20, respectively, to be discussed hereinafter in conjunction with FIG. 4. Alignment devices 42 and 44 keep first and second flat transparent surfaces 46 and 48, respectively, aligned firmly against the abutting surfaces of the adjacent modules (see FIG. 1). Still referring to FIG. 3, for purposes of the present invention, and in order to allow rapid processing, the picture elements 40 comprise liquid crystals or other transmissive electrooptical material, which allows image storage for a long period time when necessary.

To continue, electronic circuitry 50 translates the received video signals via the video bus into pictorial images. The picture elements 40 imprint information of shades of gray, polarization, and color on light passing therethrough. The first display module 14 receives control signals from the processor module 26 (see FIG. 1). The first display module 14 also receives synchronization signals from the synchronization module 24 via the video memory module 28 which instructs the first display module 14 on which image to use, when to present an image, and when to erase an image. It should be mentioned that use of a flat panel matrix display is critical to maintaining a pixel of input information on only one fixed position picture element 40 of the first display module 14. The foregoing display does not drift as a pixel on a cathode ray tube might.

Still referring to FIG. 3, the second display module 18 is configured substantially the same as the first display module 14, aforementioned, except that the first display module 14 abuts the first optics module 16 and the second optics module 20. The second display module 18 is the critical module which allows information imprinted on the light from the first display module 14 to interact with the information presented on the second display module 18, as the imprinted light passes through the second display module 18. When the information on the second display module 18 is a negative template, align in the same manner of the information or pattern of the first display module 14, a minimum amount of light passes through the second display module 18. This pattern difference information transmitted by the second display module 18 is eventually used by the processor module 26.

Figure 4:
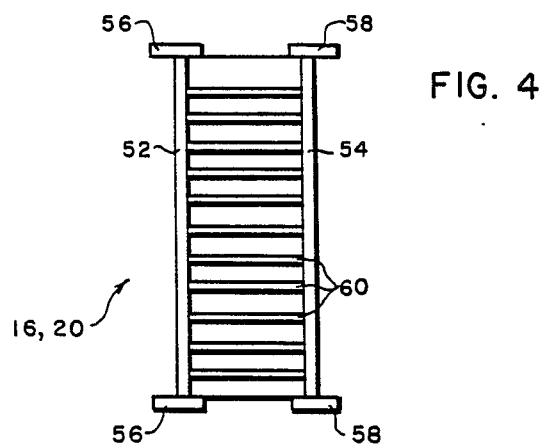
FIG. 4 is a pictorial representation of the first and second optics modules of FIG. 1.

Referring now to FIG. 4, the first optics module 16 comprises a first flat transparent surface 52 and a second flat transparent surface 54, first alignment devices 56 and second alignment devices 58, and an optical transmission line 60. The first flat transparent surface 52 is kept aligned by the first alignment devices 56. Likewise, the second flat transparent surface 54 is kept aligned by the second alignment devices 58. The aforementioned first and second transparent surfaces 52 and 54 are aligned firmly against the two abutting modules (see FIG. 1). The optical transmission line 60, for purposes of the present invention, comprises fiber optics, fiber optics bundles, or glass or plastic tiny cylinders, which ends are perpendicular to the first and second flat transparent surfaces 52 and 54, respectively. The first optics module 16 directs the light from all the picture elements 40 of the first display module 14 to all the corresponding picture elements of the second display module 18. The first optics module 16 directs the light from one and only one picture element 40 of the first display module 14 to one and only one corresponding picture element of the second display module 18. Also, stops and aperatures can be configured on each end of the optical transmission line 60 if desired. The second optics module 20 is substantially the same as the first optics module 16 except that the second optics module 20 abuts the second display module 18 and the camera module 20 (see FIG. 1).

Figure 5:
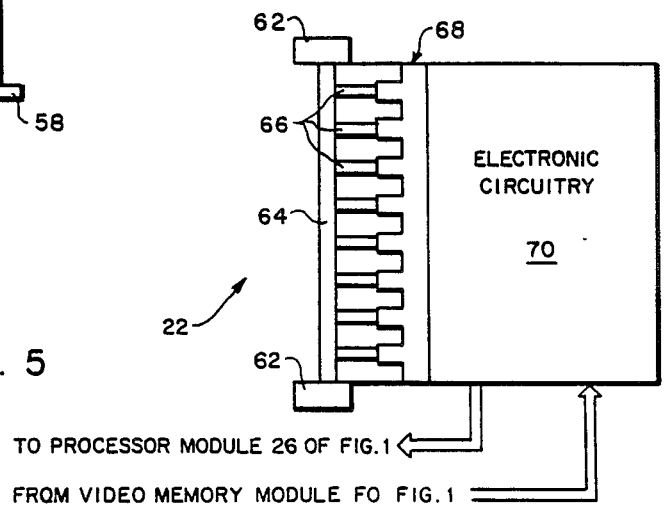
FIG. 5 is a pictorial representation of the camera module of FIG. 1.

Referring now to FIG. 5, the camera module 22 comprises alignment devices 62, a flat transparent surface 64, optics 66, photosensitive devices 68 and electronic circuitry 70. The alignment devices 62 keep the flat transparent surface 64 aligned firmly against the second optics module 20 (see FIG. 1). The optics 66, for purposes of the present invention, comprise tiny stops and aperatures for each one of the photosensitive devices 68, and can have focusing lenses of fiber optics if desired. For purposes of the present invention, the photosensitive devices 68 form an m by n matrix array of charged couple devices (CCD's) or other camera quality small solid state photosensitive devices. The electronic circuitry 70 is configured to control the timing and sensitivity of reception of light patterns and the transmission of video and control data to the processor module 14 and the video memory module 17 of FIG. 1. The electronic circuitry 70 is also configured to allow row and column readout of the CCD's.

To those skilled in the art, many modifications and variations of the present invention are possible in light of the above teachings. It is therefore to be understood that the present invention can be practice otherwise than as specifically described herein and still be within the spirit and scope of the appended claims.

What is claimed is:

1. An automatic pattern recognition apparatus for detecting and identifying electronic signal patterns transmitted thereto comprising:
   a first light source module being configured to convert a video signal to a corresponding optical image;
   a first display module operatively connected to said first light source, said first display module being configured so as to imprint information of shades of gray, polarization and color on the optical image passing therethrough from said first light source;
   a second display module;
   a first optics module operatively connected between said first display module and said second display module, said first optics module being configured so as to direct the optical image passing therethrough to said second display module, and said second display module being configured so as to imprint information of shades of gray, polarization and color on the optical image passing therethrough;
   a camera module; and
   a second optics module operatively connected between said second display module and said camera module, said second optics module being configured so as to direct the optical image passing therethrough to said camera module, and said camera module being configured so as to detect the presence of the optical image thereat and convert it to a corresponding video signal.

2. The apparatus of claim 1 further comprising:
   a processor module operatively connected to said camera module, said processor module being configured so as to analyze data from said camera module and to make decisions based thereon;
   a synchronization module operatively connected to said light source module and said processor module, said synchronization module being configured so as to generate signals to coordinate the timing of the electrical and optical signals therein; and
   a video memory operatively connected to said first and second display modules and said camera module, said video memory module being configured so as to store video pattern templates therein, and being configured so that on command from said processor module, appropriate patterns, with image correction, can be recalled and transmitted to said first and second display modules.

3. The apparatus of claim 2 wherein said light source module, said first display module, said second display module, said second optics module and said camera module are configured so as to be packaged and optically aligned together.

4. The apparatus of claim 3 wherein said light source module comprises:
   a plurality of light emitting devices;
   electronic circuitry operatively connected to said plurality of light emitting devices and to said synchronization module, said electronic circuit being configured to use the signals from said synchronization module so as to control each one of said plurality of light emitting devices in timing and in brightness level;
   optics for collimating the light from said plurality of light emitting devices;
   a flat transparent surface disposed adjacent to said optics; and
   alignment devices being operatively affixed to said light source module so as to allow said flat transparent surface thereof to be aligned firmly against said first display module.

5. The apparatus of claim 4 wherein said first display module comprises:
   an array of picture elements;
   second electronic circuitry operatively connected to said array of picture elements and to said video memory module, said second electronic circuitry being configured so as to translate the video signals from said video memory module into pictorial images on said array of picture elements, said array of picture elements imprinting information of shades of gray, polarization, and color on light passing therethrough;
   a first transparent surface operatively affixed to said array of picture elements on a first side thereof;
   a second flat transparent surface operatively affixed to the other side of said array of picture elements;
   first alignment devices being operatively affixed to said first display module so as to allow said first flat transparent surface to be aligned firmly against said flat transparent surface of said light source module; and
   second alignment devices being operatively affixed to said first display module so as to allow said second flat transparent surface to be aligned firmly against said first optics module.

6. The apparatus of claim 5 wherein said first optics module comprises:
   a first flat transparent surface operatively aligned firmly against said second flat transparent surface of said first display module;
   a second flat transparent surface;
   an optical transmission line operatively affixed between said first and second transparent surfaces;
   first alignment devices operatively affixed to said first optics module so as to allow said first flat transparent surface to be aligned firmly against said second flat transparent surface of said first display module; and
   second alignment devices operatively affixed to said first optics module so as to allow said second flat transparent surface to be aligned firmly against said second display module.

7. The apparatus of claim 6 wherein said second display module comprises:
   an array of picture elements; second electronic circuitry operatively connected to said array of picture elements and to said video memory module, said second electronic circuitry being configured so as to translate the video signals from said video memory module into pictorial images on said array of picture elements, said array of picture elements imprinting information of shades of gray, polarization, and color on light passing therethrough;

a first flat transparent surface operatively affixed to said array of picture elements on a first side thereof;

a second flat transparent surface operatively affixed to the other side of said array of picture elements;

first alignment devices being operatively affixed to said first display module so as to allow said first flat transparent surface to be aligned firmly against said flat transparent surface of said light source module; and second alignment devices being operatively affixed to said first display module so as to allow said second flat transparent surface to be aligned firmly against said second optics module.

8. The apparatus of claim 7 wherein said second optics module comprises:

a first flat transparent surface operatively aligned firmly against said second flat transparent surface of said second display module;

a second flat transparent surface;

an optical transmission line operatively affixed between said first and second transparent surfaces;

first alignment devices operatively affixed to said first optics module so as to allow said first flat transparent surface to be aligned firmly against said second flat transparent surface of said second display module; and second alignment devices operatively affixed to said second optics module so as to allow said second flat transparent surface to be aligned firmly against said camera module.

9. The apparatus of claim 8 wherein said camera module comprises:

a flat transparent surface;

alignment devices being operatively affixed to said camera module so as to allow said flat transparent surface thereof to be aligned firmly against said second flat transparent surface of said second optics module;

photosensitive devices;

optics operatively connected between said flat transparent surface and said photosensitive devices; and electronic circuitry operatively connected to said photosensitive devices and to said video memory module so as to detect the present of the optical image at said photosensitive devices.

* * * * *